United States Patent [19]
Murakami et al.

[11] Patent Number: 5,347,098
[45] Date of Patent: Sep. 13, 1994

[54] METHOD OF WELDING NICKEL OR NICKEL ALLOY PRODUCTS

[75] Inventors: Yasuo Murakami; Hideki Kashimura, both of Hikari; Kiichi Katayama, Tokyo; Hiroshi Imaizumi, Tokyo; Toshio Katou, Tokyo; Hideaki Nakashima, Tokyo, all of Japan

[73] Assignees: Nippon Steel Corporation; Aichi Sangyo Co., Ltd., both of Tokyo, Japan

[21] Appl. No.: 913,186

[22] Filed: Jul. 14, 1992

[30] Foreign Application Priority Data

Jul. 15, 1991 [JP] Japan ................. 3-266741

[51] Int. Cl.$^5$ ............................... B23K 9/23
[52] U.S. Cl. ........................... 219/61; 219/75; 219/125.12; 219/137 WM
[58] Field of Search ............ 219/146.22, 146.23, 219/137 R, 137 WM, 74, 75, 125.12, 61

[56] References Cited

U.S. PATENT DOCUMENTS

| | | | |
|---|---|---|---|
| 2,905,805 | 9/1959 | McElrath et al. | 219/137 R |
| 3,639,724 | 2/1972 | Gerath | 219/137 R |
| 4,213,026 | 7/1980 | Duvall et al. | 219/137 R |
| 4,673,123 | 6/1987 | Shin et al. | 219/146.23 |
| 5,071,059 | 12/1991 | Heitman et al. | 219/76.13 |
| 5,083,002 | 1/1992 | Hoback et al. | 219/137 R |

FOREIGN PATENT DOCUMENTS

| | | |
|---|---|---|
| 484960 | 1/1976 | European Pat. Off. |
| 50-015454 | 6/1975 | Japan |
| 58-029581 | 2/1983 | Japan |

OTHER PUBLICATIONS

R. Lahnsteiner, "The T.I.M.E. process – an innovative MAG welding process" Feb. 1992, the whole document.

Primary Examiner—Clifford C. Shaw
Attorney, Agent, or Firm—Wenderoth, Lind & Ponack

[57] ABSTRACT

A method of welding metal products, at least one of which is made of nickel or a nickel alloy, comprises the steps of generating an arc between the products to be welded, serving as a positive pole, and a tungsten electrode held by a welding torch, serving as a negative pole. A shielding gas is emitted, consisting of an argon-based mixed gas containing one or both of hydrogen and helium, from a confining gas nozzle concentric with the tungsten electrode, thus confining the apparent flaring angle of the arc within 80 degrees. The welding torch is moved along the weld line while feeding the tip of a filler wire to a part of the molten pool directly below the arc. This method is applicable to the welding of metal products, at least one of which is made of nickel or a nickel alloy.

19 Claims, 5 Drawing Sheets

METHOD OF WELDING NICKEL OR NICKEL ALLOY PRODUCTS

BACKGROUND OF THE INVENTION

1. Field of the Invention

This invention relates to welding methods for nickel or nickel alloy products having excellent corrosion resistance and high-temperature strength, clad metals covered with a layer of nickel or a nickel alloy, and double pipes with a mechanically joined inner pipe of nickel or a nickel alloy, and more particularly to gas tungsten arc welding methods therefor.

2. Description of the Prior Art

Recently the number of natural gas and oil wells exploited in highly corrosive environments and chemical plant pipelines used for the transportation of highly corrosive fluids has been increasing sharply.

Conventional carbon steel pipes, even if corrosion resistance is improved by the addition of special alloying elements or by special heat treatments, or even if corrosion inhibitors are added to the corrosive fluids they conduct, cannot prevent corrosion from the inside. Besides, they do not have high enough strength to withstand the increasing pressure involved in the transportation of fluids.

This is the reason why products of nickel or a nickel alloy (alloys containing more than approximately 15% each of chromium and nickel), clad metals overlain with a layer of nickel or a nickel alloy and double pipes with an inner pipe of nickel or a nickel alloy have found extensive use. Gas tungsten arc welding having the following advantages is commonly used with these pipes.

(1) Welding with low rates of gas dilution does not heavily impair the corrosion resistance of welded joints.

(2) Few weld defects occur when welding is performed under appropriate conditions.

(3) A beautiful and smooth appearance can be obtained, without requiring slag removal or bead grinding during welding.

High-nickel or high-molybdenum welding materials having a higher corrosion resistance and high-temperature strength than the base metal (the inner pipe or cladding metal in the case of a double pipe) are used. For example, Inconel 625 or Hastelloy 276 (trademarks for corrosion-resistant nickel-base alloys) are commonly chosen.

Conventional gas tungsten arc welding is so inefficient and time-consuming that construction of long pipelines has been very costly. Though recently developed high-strength clad steel pipes overlain with Incoloy 825 (a trademark for corrosion-resistant alloys) or Inconel 625 or reinforced with a mechanically joined inner pipe has realized a substantial cutback in material cost, the high construction cost mentioned above has prevented the expansion of their use.

Welding of nickel-rich alloys or high-strength clad metals overlain with such alloys with high-nickel filler metals such as Inconel 625 or Hastelloy 276 by the conventional gas tungsten arc process basically differs from that of carbon steel in the following two points.

When molten, to begin with, the alloys are more viscous and less fluid, and, therefore, does not wet the sides of the groove as much as carbon steel. Wetting of the groove sides by the molten metal is very important is welding performed in all positions, as in the on-site welding of pipelines. The interfacial tension built up by the wetting between the base metal and deposited metal supports the weight of the molten metal, thereby permitting continuous welding without causing burn-through.

While carbon steel pipes can be welded with a high deposition rate, high-nickel alloy pipes must be welded with a low deposition rate. This is the reason for the low-efficiency welding mentioned before.

The poor wetting has conventionally been improved by simultaneously causing the arc torch and filler wire to oscillate through the groove. This conventional method is designed to promote the groove sides by the deposited metal by oscillation, placing an appropriate amount of deposited metal at the most suitable point in the groove, which is, to be more specific, near the side walls thereof, and thus prevent burn-through.

Still, this oscillating method too has its limit. When the stroke of oscillation is increased, the welding speed in the middle of the groove becomes so high that an insufficient heat input and the filler wire sticking tend to occur to impair the quality of welding.

Secondly, the depth of penetration resulting from the arc welding of high-nickel alloys is smaller than that with carbon steel. Therefore, the groove in the weld zone (the height of the root face) must be reduced to between approximately 1.0 and 1.4 mm, whereas the butt weld must be made with extremely high accuracy. This is another reason for the low construction efficiency.

Filling these gaps with carbon steel is the key point in the improvement of the welding technology for products of nickel or a nickel alloy, clad metals covered with a layer of nickel or a nickel alloy, and double pipes with a mechanically joined inner pipe of nickel or a nickel-alloy. Various attempts have been made to improve the conventional gas tungsten arc welding method. For example, the welding current was increased beyond the tolerable limit to increase the wetting by the deposited metal and the oscillating speed was lowered to obtain a deeper penetration. However, these attempts have not brought about any major improvement in welding efficiency, often entailing, instead, various welding defects.

SUMMARY OF THE INVENTION

The object of this invention is to solve the conventional technical problems described above by providing efficient defect-free gas tungsten arc welding methods for nickel or nickel alloy products.

A gas tungsten arc welding method of this invention comprises the steps of generating an arc between the work serving as the anode and a tungsten electrode on a welding torch serving as the cathode, emitting a jet of shielding gas which comprises an argon-based gas mixture containing one or both of hydrogen and helium from a confining gas nozzle having a guide wall concentric with the tungsten electrode, confining the apparent flaring angle of the arc to within 80 degrees, and moving the welding torch along the weld line while feeding the tip of the filler wire into a molten pool formed directly below the arc.

Another gas tungsten arc welding method of this invention comprises the steps of generating an arc between the work serving as the anode and a tungsten electrode on a welding torch serving as the cathode, emitting a jet of shielding gas from a confining gas nozzle concentric with the tungsten electrode, causing a first filler wire to oscillate together with the welding torch with a predetermined amplitude and cycle in a direction perpendicular to the weld line and moving the same along the weld line while feeding the tip of the first filler wire into a part of a molten pool formed directly below the arc, and causing a second filler wire to oscillate in synchronism with the motion of the first filler wire and moving the same along the weld line while feeding the tip of the second filler wire into the molten pool at a point 180 degrees away from the oscillating phase of the first filler wire.

The shielding gas used in this invention is an argon-based gas mixture containing one or both hydrogen and helium.

The welding methods of this invention remarkably elevate the temperature of the molten pool directly below the arc by increasing the energy of the arc by supplying the shielding gas, which comprises a mixture of argon with one or both of hydrogen and helium, to the welding torch having a confining gas nozzle and concentrating the distribution of the arc at the anode. This improvement readily enhances the penetration in the first (root) pass, in particular, with the resulting welding efficiency being three to four times higher than that of the conventional gas tungsten arc welding.

The oscillation of two filler wires in the groove is effective on the second and other subsequent passes. The resulting higher molten pool temperature permits increasing the feed rate and oscillation amplitude of the first filler wire, which, in turn, realizes welding with high deposition rate. The increased wetting and the cooling effect of the second filler wire, in combination, prevents the dropping of the molten metal and assures the forming of defect-free welds of satisfactory quality.

This invention is applicable to the welding of pipes, sheets, plates and various structural shapes of metals, with at least one of the pipes, sheets, plates and structures being made of nickel or a nickel alloy. This invention further expands the use of various forms of nickel or nickel alloy products including clad metals overlain with nickel or a nickel alloy and double pipes having a mechanically joined inner pipe of nickel or a nickel alloy.

BRIEF DESCRIPTION OF THE DRAWINGS

FIGS. 1(a)–1(c) show a mechanically joined corrosion-resistant double pipe made by applying a welding method of this invention.

DESCRIPTION OF THE PREFERRED EMBODIMENTS

A preferred embodiment of this invention will be described by reference to FIG. 1, which shows an example of all-position welding applied to a mechanically joined corrosion-resistant double pipe.

Figure 1A:
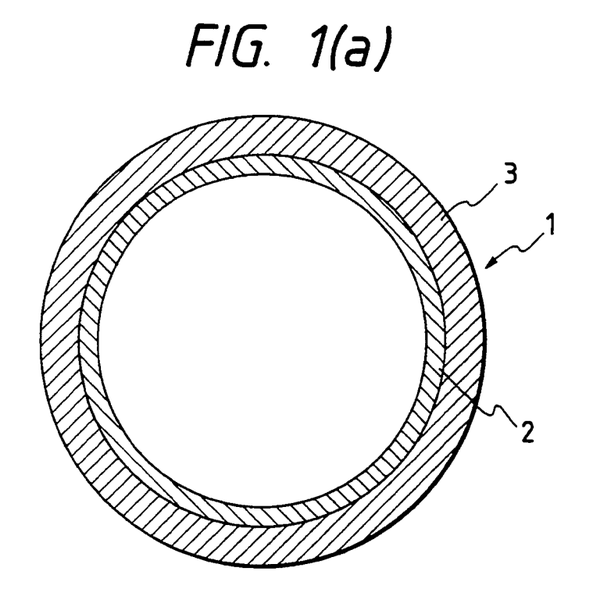
FIG. 1(a) is a cross-sectional view of the double pipe.
Figure 1B:
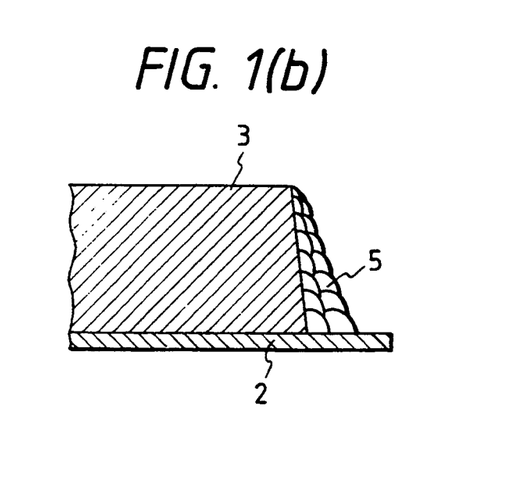
FIG. 1(b) is a cross-sectional view of a seal-welded end of the same pipe.
Figure 1C:
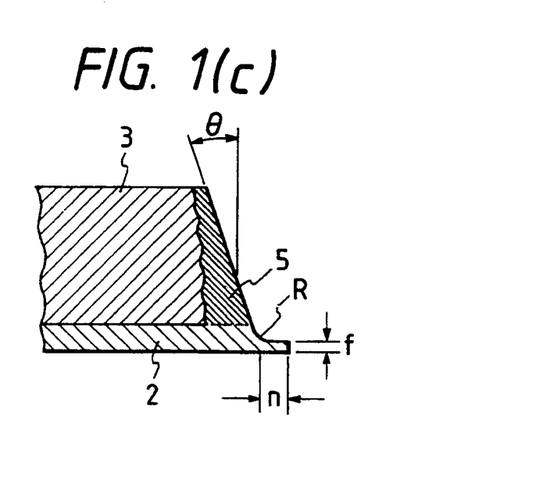
FIG. 1(c) is a detail view of a groove between two double pipes joined together by butt welding.

FIG. 1 shows a cross-section of a mechanically joined corrosion-resistant double pipe made by a welding method according to this invention.

A corrosion-resistant double pipe 1 shown in FIG. 1(a) consists of a corrosion-resistant inner pipe 2 containing a high percentage of nickel and an outer pipe 3 of high-strength, high-toughness carbon steel. The two pipes are mechanically joined or otherwise put together by either expanding the inner pipe or heating and shrink fitting the outer pipe.

Both ends of the corrosion-resistant double pipe 1 should preferably be seal-welded by forming an overlay 5 by automatic gas tungsten arc welding with a filler wire containing much more nickel or molybdenum than the inner pipe 2, as shown in FIG. 1(b).

Then, two corrosion-resistant double pipes 1 are butt-welded. As shown in FIG. 1(c), a groove for butt welding is formed between the two pipes according to the predetermined groove angle $\theta$ (e.g., 22.5 degrees), root face thickness f (e.g., 1.6 mm), nose length n (e.g., 2.8 mm) and root radius R (e.g., 1.2 mm R).

The nickel or molybdenum content of the overlain weld 5 thus formed should preferably be higher than that of the inner pipe 2 and substantially equal to that of the welding material so that the resulting condition is similar to the one obtained when a pipe of such composition is welded thereto.

Figure 2:
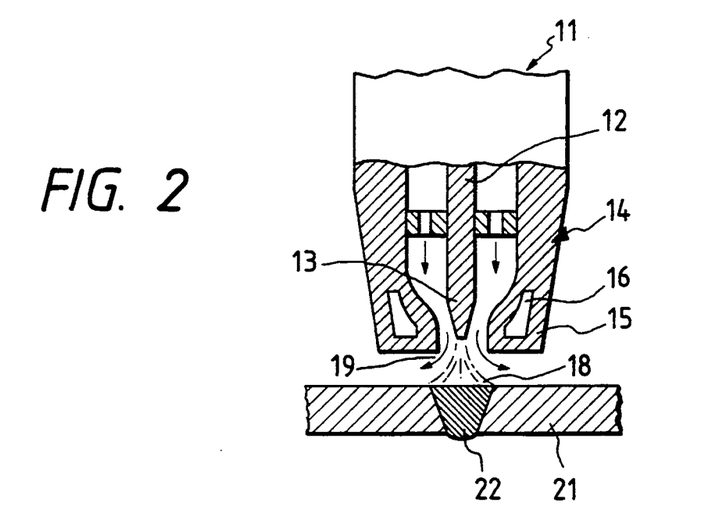
FIG. 2 is a vertical cross-sectional view of a welding torch used in a welding method of this invention.

Referring now to FIG. 2, an automatic gas tungsten arc welding torch used in a welding method of this invention will be described.

A welding torch 11 has a tungsten electrode 12 connected to the negative pole of a power supply (not shown). An arc 18 is formed between the tungsten electrode 12 and the base metal 21, with a molten pool 22 of metal formed directly below the arc. The welding torch 11 also has a confining gas nozzle 14 concentric with the tungsten electrode 12. The tip 15 of the confining gas nozzle 14 is constricted so that the apparent or visible flaring angle of the arc should not exceed 80 degrees. The tip 13 of the tungsten electrode 12 is positioned at the tip 15 of the nozzle. A cooling water passage 16 is provided at the tip 15 of the confining gas nozzle 14. The cooling water flowing through the passage 16 keeps the inner wall of the confining gas nozzle 14 below, for example, 40° C. during welding. A shielding gas 19 supplied to the confining gas nozzle 14 is emitted from an opening between the nozzle tip 15 and the tip 13 of the tungsten electrode.

The welding torch 11 with the confining gas nozzle 14 just described is of a common type usually used for keyhole plasma-arc welding. However, the pressure or flow rate of the shielding gas for the keyhole welding is too much for the welding method of this invention. The flow rate employed in general gas tungsten arc welding is appropriate. To be more specific, the appropriate flow rate of the shielding gas 19 is 3 to 8 liters per minute. Within this range, the arc 18 does not become parallel-sided like a plasma arc and no keyhole is formed in the molten pool 22.

The use of the welding torch 11 with the confining gas nozzle 14 in the way just described and an argon-based shielding gas 19 mixed with one or both of hydrogen and helium that induce ionization or dissociation increases the energy of the arc column, accelerates the concentration of anode distribution, and remarkably elevates the temperature of a part of the molten pool 22 directly below the arc. This gas, together with the design of the confining gas nozzle, readily confines the apparent flaring angle of the gas tungsten arc within 80 degrees.

The mixed gases (argon plus hydrogen, argon plus helium, or argon plus hydrogen and helium) produce remarkable effects.

The mixed gases of the following three compositions are recommendable.

(1) A mixed gas consisting of 95 to 98% of industrially pure argon and 2 to 5% of industrially pure hydrogen.

(2) A mixed gas consisting of 40 to 50% of industrially pure argon and 50 to 60% of industrially pure helium.

(3) A mixed gas consisting of 45 to 55% of industrially pure argon, 40 to 50% of industrially pure helium, and 2 to 5% of industrially pure hydrogen.

When two filler wires oscillate in the groove, the molten pool directly below the arc is heated to such a high temperature as to permit the first filler wire to be continuously inserted therein. This greatly increases the melting speed of the first filler wire and widens the difference in temperature and surface tension between the peripheral and central parts of the molten pool. The widened difference in surface tension strengthens the surface stream of the molten metal supplied from the first filler wire, contributing greatly to the enhancement of wetting mentioned before.

Figure 3A:
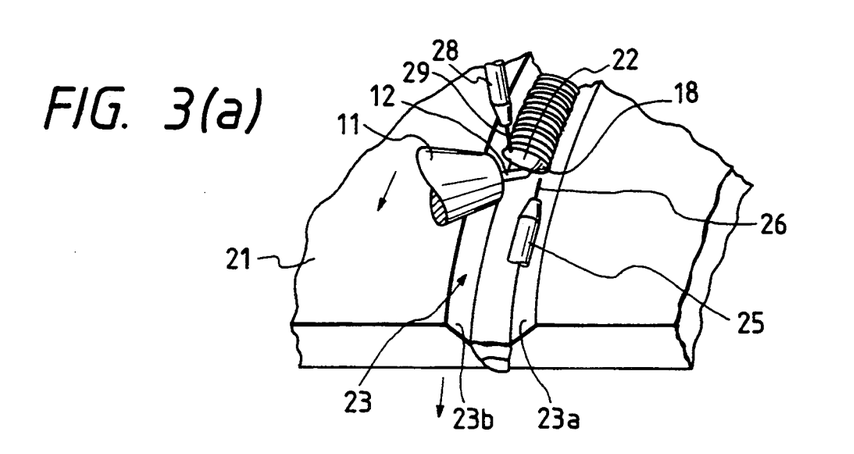
FIGS. 3(a) and (b) are perspective views showing the relative position of a first and a second filler wire oscillating in a welding method of this invention.
Figure 3B:
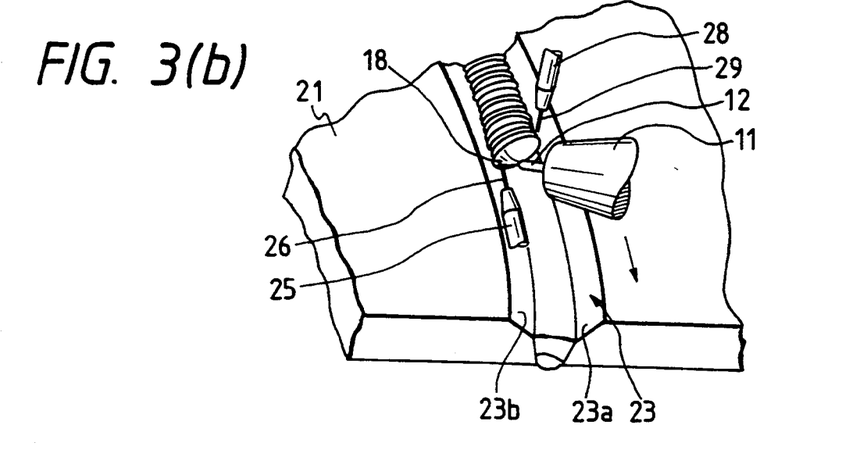
Figure 4:
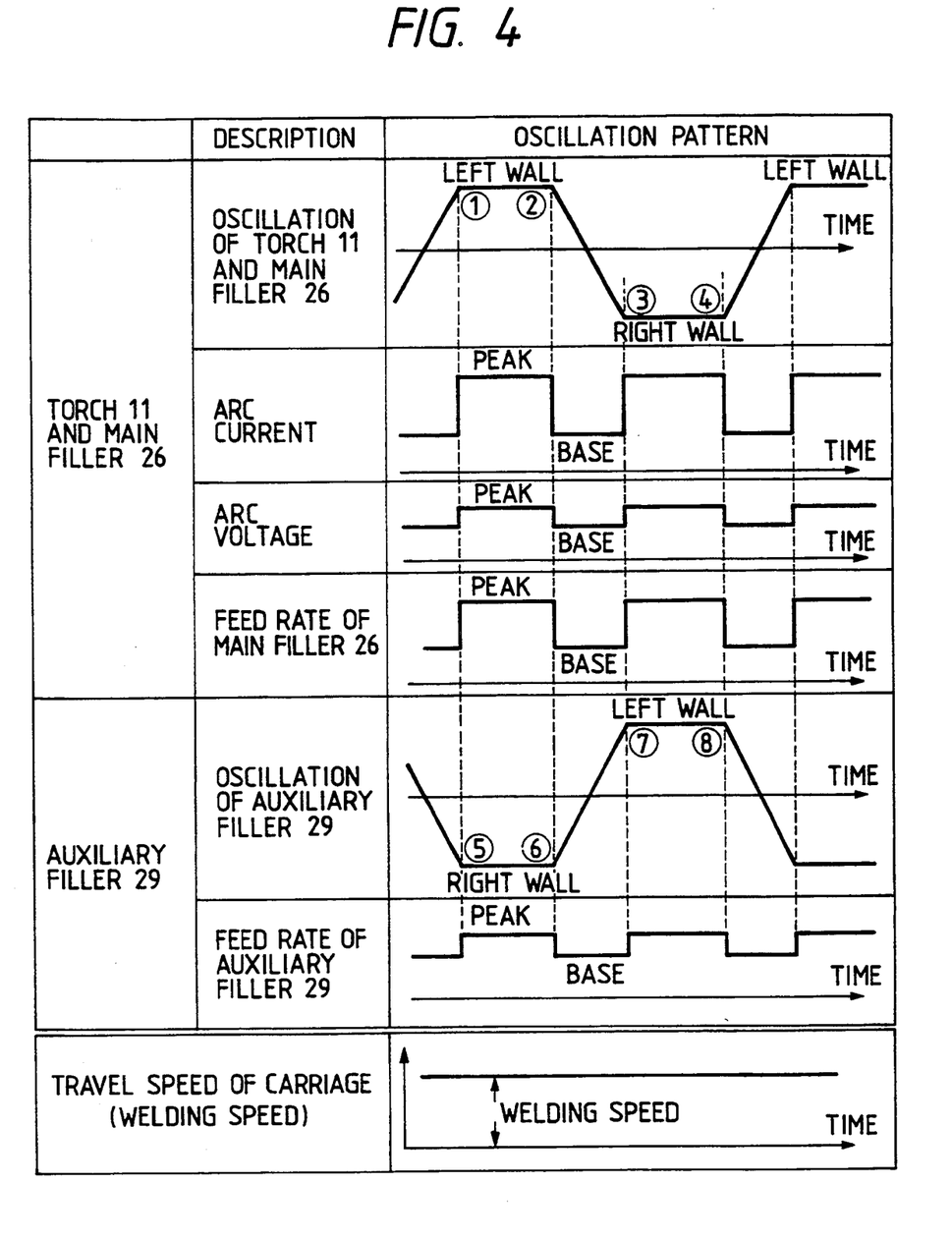
FIG. 4 diagrammatically shows how the conditions of an automatic gas tungsten arc welding method according to this invention are controlled. The controlled welding conditions include the welding speed, oscillation of the welding torch and first filler wire, pulse of the arc, feed rate of the first filler wire, and oscillation and feed rate of the second filler wire.

Referring to FIGS. 3 and 4, a method of oscillating a first filler wire (hereinafter called the main filler wire) and a second filler wire (hereinafter called the auxiliary filler wire) according to this invention will be described below.

The welding torch 11 and a main filler nozzle 25 according to this invention oscillate with a predetermined amplitude and cycle in a groove 23 in a direction perpendicular to the weld line, as shown in FIGS. 3(a) and (b). In FIG. 3(a), the welding torch 11 and main filler nozzle 25 oscillate to the right wall 23a and dwell there for a given time. Continuous welding is performed in this state, with a converged arc 18 generated at the tip 13 of the tungsten electrode 12 in the welding torch 11, a molten pool 22 formed thereunder, and the main filler wire 26 fed from the main filler nozzle 25 into the molten pool 22 directly below the arc.

An auxiliary filler nozzle 28 feeds the auxiliary filler wire 29 to the backward part of the molten pool 22 from the opposite side of the main filler wire 26 coaxial with the oscillating direction. The relative position of the main filler wire 26 and auxiliary filler wire 29 is controlled so that the auxiliary filler wire 29 oscillates in synchronism with the welding torch 11 and main filler wire 26, as shown in FIG. 3(b) in which the main filler wire 26 oscillates to the left wall 23b.

FIG. 4 shows how the welding speed of the torch carriage, oscillation of the welding torch 11 and main filler wire 26, current and voltage pulses of the arc 18, feed rate of the main filler wire 26, and oscillation and feed rate of the auxiliary filler wire 29 are controlled.

For example, low current and voltage pulses are selected so that the peak and base periods thereof can be freely set between 0.5 and 3 Hz. In FIG. 4, the peak period is identical with a period during which the welding torch 11 and main filler wire 26 dwell at the left wall 23b of the groove, whereas the base period is identical with a period during which the welding torch 11 and main filler wire 26 passes the middle part of the groove 23. The feed rate of the main filler wire 26 and auxiliary filler wire 29 is also pulse-controlled, with the peak and base feed rates of each filler wire being synchronized with the peak and base periods of the arc 18.

The feed rate of the main filler wire 26 and auxiliary filler wire 29 should preferably be set so that the metal from the main filler wire 26 accounts for 80% to 90% of the deposited metal and the metal from the auxiliary filler wire 29 accounts for 10% to 20% thereof. As is obvious from FIG. 4, the auxiliary filler wire 29 is fed to cool the peripheral part at the back of the molten pool 22 by liberating the latent heat therefrom. This further increases the surface tension of the sufficiently wet molten metal between the side walls 23a and 23b of the groove 23. The deposited metal from the main filler wire 26 prevents the drop of molten metal when all-position welding is performed in the downward and upward positions, thus permitting an all-position welding with a higher deposition efficiency than before.

Figure 5:
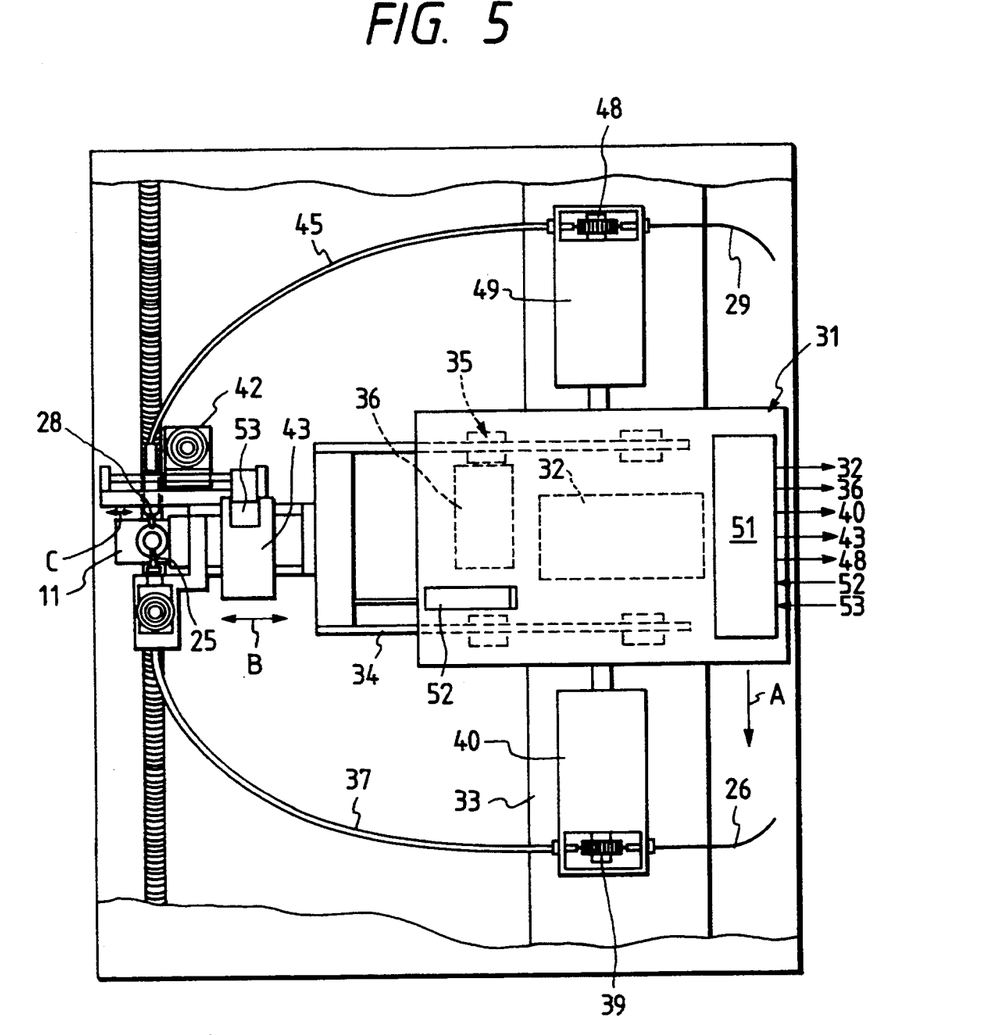
FIG. 5 is a schematic plan view of a welding apparatus for implementing a welding method according to this invention.

FIG. 5 schematically shows an automatic welding apparatus to implement the welding method of this invention.

A carriage 31 driven by a travelling motor 32 runs in the direction of arrow A over rails 33 laid along the weld line at a desired welding speed. To the forward end of an oscillation frame 34 mounted on the carriage 31 are attached the welding torch 11 and main filler nozzle 25. A main oscillation unit 35 is connected to the oscillation frame 34. The main oscillation unit 35, which comprises a crank and cam mechanism and an oscillation motor 36 to drive the crank and cam mechanism, causes the oscillation frame 34 to oscillate. As a consequence, the welding torch 11 and main filler nozzle 25 oscillate integrally in direction B that is perpendicular to the weld line. Near the forward end of the oscillation frame 34 is provided an auxiliary oscillation unit 42 which comprises a cam mechanism and an oscillation motor 43 to drive the same, The auxiliary filler nozzle 28 connected to the auxiliary oscillation unit 42 oscillates in direction C that is perpendicular to the weld line. A pair of pinch rolls 48 driven by a feed motor 49 feeds the auxiliary filler wire 29 through a feed liner 45 to the auxiliary filler nozzle 28.

A control unit 51 controls the travelling motor 32, oscillation motors 36 and 43, and feed motors 40 and 49 connected thereto to realize an oscillation pattern shown in FIG. 4. The control unit 51 is an ordinary computer control unit having a sequence control function. A main filler amplitude detector 52 and an auxiliary filler amplitude detector 53 detect the oscillation patterns of the main filler wire 26 and auxiliary filler wire 29 and input the detected patterns into the control unit 51. The control unit 51 feeds back the oscillation patterns for further control.

EXAMPLE

The following is a specific example of field welding performed with corrosion-resistant double pipes of the type shown in FIG. 1.

Figure 6:
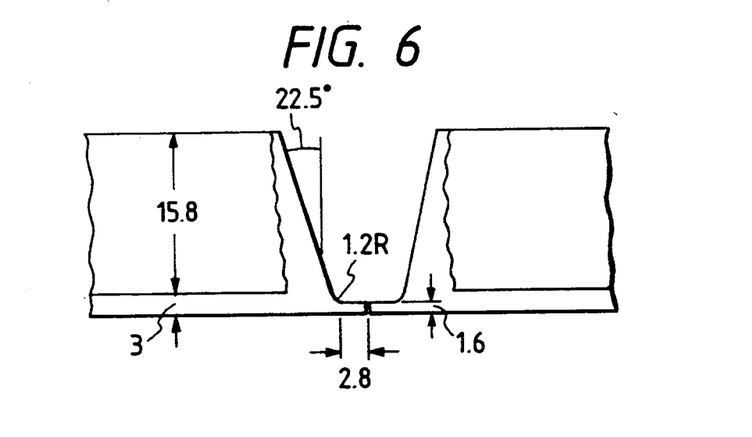
FIG. 6 is a cross-sectional view showing the profile of a groove between two corrosion-resistant double pipes joined together by a welding method of this invention, and the dimensional tolerance of the groove and butt weld.

Specifications of corrosion-resistant double pipes
(1) Dimensions
  Outside diameter: 145.6 mm
  Wall thickness:
    Outer pipe: 15.8 mm
    Inner pipe: 3.0 mm
(2) Material
  Outer pipe: API 5L, X70
  Inner pipe: Incoloy 825 (UNSN08825)
(3) Overlay welding at pipe end
  Automatic gas tungsten arc welding
  Welding position: pipe rotation 1G
  Welding material: Inconel 625 filler wire Table 1 and FIG. 6 show the profile and dimensions of the groove between the welded pipes and the dimensional tolerance of the groove and butt weld.

TABLE 1

| Dimensional Tolerance of Groove | | Dimensional Tolerance of Butt Weld | |
|---|---|---|---|
| Groove Angle | 22.5 ± 5° | Offset | ±0.8 mm |
| Height of Root Face | 1.6 ± 0.3 mm | | |
| Nose Length | 2.8 ± 0.4 mm | Root Gap | 0~0.5 mm |
| Root Radius | 1.2~1.4 R | | |

Figure 7A:
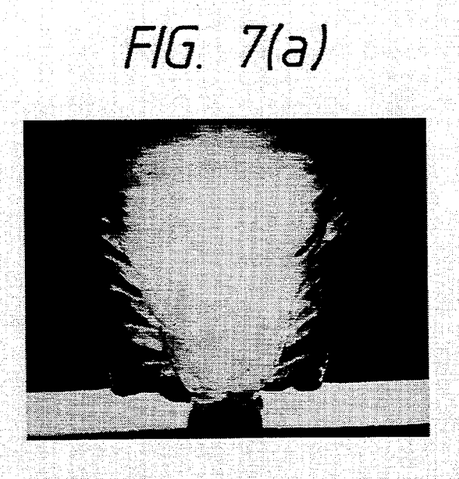
FIG. 7(a) is a macroscopic photograph of a weld joint made by a welding method according to this invention.
Figure 7B:
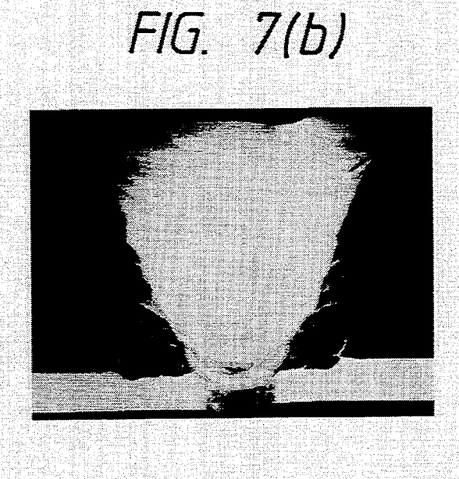
FIG. 7(b) is a macroscopic photograph of a weld joint made by a conventional automatic gas tungsten arc welding method.

Tables 2 and 3 show the welding conditions and required arc time of the all-position welding according to this invention and the conventional automatic gas tungsten arc welding, respectively. FIG. 7 (a) is a macroscopic photograph of a weld joint made by a welding method according to this invention. FIG. 7 (b) is a macroscopic photograph of a weld joint made by a conventional automatic gas tungsten arc welding method.

TABLE 2

| Type of Torch and Shielding Gas | Pass No. | Pulse Arc Heat Input | | | | | | | Torch Travel Speed (cm/min) |
|---|---|---|---|---|---|---|---|---|---|
| | | Current (Amp) | | | Voltage (Volt) | | Pulse Ratio (%) | | |
| | | Peak | Base | Mean | Peak | Base | Peak | Base | |
| • Confining Gas Nozzle | 1 | 110 | 40 | 68 | 11.3 | — | 40 | 60 | 13.2 |
| | 2 | 160 | 70 | 120 | 11.4 | 10.4 | 57 | 43 | 9.8 |
| • Mixture of 96.5% Ar and 3.5% H$_2$ | 3 | 180 | 80 | 130 | 12.0 | 11.6 | 50 | 50 | 9.8 |
| | 4 | 220 | 120 | 170 | 12.4 | 11.8 | 50 | 50 | 7.9 |
| | 5 | 220 | 120 | 175 | 12.4 | 11.8 | 55 | 45 | 7.9 |
| | 6 | 220 | 140 | 180 | 12.4 | 11.8 | 50 | 50 | 6.6 |

| Type of Torch and Shielding Gas | Pass No. | Oscillation Condition | | | | Filler Metal Feed Rate (cm/min) | | | | Arc Time (min) |
|---|---|---|---|---|---|---|---|---|---|---|
| | | Amplitude (mm) | Operating time (sec) | | | Main Filler | | Auxiliary Filler | | |
| | | | Left-Wall | Middle | Right Wall | Peak | Base | Peak | Base | |
| • Confining Gas Nozzle | 1 | — | — | — | — | — | 152 | — | — | 3.1 |
| | 2 | 3.8 | 0.4 | 0.3 | 0.4 | 355 | 254 | 50 | 25 | 4.3 |
| • Mixture of 96.5% Ar and 3.5% H$_2$ | 3 | 4.6 | 0.4 | 0.3 | 0.4 | 406 | 304 | 89 | 38 | 4.4 |
| | 4 | 6.1 | 0.4 | 0.4 | 0.4 | 457 | 457 | 81 | 50 | 5.4 |
| | 5 | 8.9 | 0.5 | 0.4 | 0.5 | 482 | 482 | 81 | 50 | 5.4 |
| | 6 | 13.9 | 0.5 | 0.5 | 0.5 | 482 | 482 | — | — | 6.5 |
| | | | | | | | | | | Total 29.4 min |

TABLE 3

| Type of Torch and Shielding Gas | Pass No. | Pulse Arc Heat Input | | | | | | | Torch Travel Speed (cm/min) | Oscillation Condition | | | | Filler Metal Feed Rate (cm/min) | | Arc Time (min) |
|---|---|---|---|---|---|---|---|---|---|---|---|---|---|---|---|---|
| | | Current (Amp) | | | Voltage (Volt) | | Pulse Ratio (%) | | | Amplitude (mm) | Operating time (sec) | | | | | |
| | | Peak | Base | Mean | Peak | Base | Peak | Base | | | Left Wall | Middle | Right Wall | Peak | Base | |
| • Conventional GTAW Torch • Pure Argon Gas | 1 | 125 | 55 | 83 | 9.4 | — | 40 | 60 | 7.3 | — | — | — | — | — | 89 | 5.6 |
| | 2 | 160 | 50 | 105 | 9.2 | 7.2 | 50 | 50 | 7.3 | 3.5 | 0.3 | 0.3 | 0.3 | 89 | 64 | 5.6 |
| | 3 | 180 | 80 | 137 | 9.2 | 7.4 | 57 | 43 | 7.3 | 4.0 | 0.4 | 0.3 | 0.4 | 114 | 89 | 5.6 |
| | 4 | 180 | 80 | 137 | 9.2 | 7.4 | 57 | 43 | 7.3 | 4.3 | 0.4 | 0.3 | 0.4 | 114 | 89 | 5.6 |
| | 5 | 180 | 80 | 130 | 9.2 | 7.4 | 50 | 50 | 7.3 | 5.1 | 0.4 | 0.4 | 0.4 | 114 | 89 | 5.6 |
| | 6 | 180 | 80 | 130 | 9.2 | 7.4 | 50 | 50 | 6.5 | 6.8 | 0.4 | 0.4 | 0.4 | 140 | 114 | 6.1 |
| | 7-1 | 180 | 80 | 130 | 9.2 | 7.4 | 50 | 50 | 6.5 | 3.5 | 0.4 | 0.3 | 0.2 | 114 | 89 | 6.1 |
| | 7-2 | 180 | 80 | 130 | 9.2 | 7.4 | 50 | 50 | 6.5 | 3.5 | 0.2 | 0.3 | 0.4 | 114 | 89 | 6.1 |
| | 8-1 | 180 | 80 | 130 | 9.2 | 7.4 | 50 | 50 | 6.5 | 4.3 | 0.4 | 0.3 | 0.2 | 114 | 89 | 6.1 |
| | 8-2 | 180 | 80 | 130 | 9.2 | 7.4 | 50 | 50 | 6.5 | 4.3 | 0.2 | 0.3 | 0.4 | 114 | 89 | 6.1 |
| | 9-1 | 180 | 80 | 130 | 9.2 | 7.4 | 50 | 50 | 6.5 | 4.8 | 0.4 | 0.3 | 0.2 | 114 | 89 | 6.1 |
| | 9-2 | 180 | 80 | 130 | 9.2 | 7.4 | 50 | 50 | 6.5 | 4.8 | 0.2 | 0.3 | 0.4 | 114 | 89 | 6.1 |
| | 10-1 | 180 | 80 | 137 | 9.2 | 7.4 | 57 | 43 | 6.5 | 5.6 | 0.4 | 0.3 | 0.4 | 114 | 89 | 6.1 |
| | 10-2 | 180 | 80 | 137 | 9.2 | 7.4 | 57 | 43 | 6.5 | 5.6 | 0.4 | 0.3 | 0.4 | 114 | 76 | 6.1 |
| | 11-1 | 180 | 80 | 137 | 9.2 | 7.4 | 57 | 43 | 6.5 | 5.8 | 0.4 | 0.3 | 0.4 | 76 | 76 | 6.1 |
| | 11-2 | 180 | 80 | 137 | 9.2 | 7.4 | 57 | 43 | 6.5 | 5.8 | 0.4 | 0.3 | 0.4 | 76 | 76 | 6.1 |
| | | | | | | | | | | | | | | | | Total 95.1 min |

As is obvious from Tables 2 and 3, the welding method of this invention required an arc time of 29.4 minutes, against 95.1 minutes required by the conventional automatic arc welding method. The efficiency of the welding method according to this invention was approximately three times greater than that of the conventional gas tungsten arc welding method.

As can be seen from the photographs of macrostructures shown in FIGS. 7 (a) and (b), welding by the method of this invention can be accomplished in six passes, and it permits oscillation with great amplitude between the second and final passes. In contrast, the conventional gas tungsten arc welding method requires sixteen passes and, in addition, bead parting to prevent sticking, as shown in FIG. 7 (b).

Table 4 shows examples of welding made by methods combining the confining gas nozzle and shielding gas according to this invention, while Table 5 shows examples of welding made by methods combining the confining gas nozzle and filler metal according to this invention.

TABLE 4

| Type of Torch and Shielding Gas | Pass No. | Pulse Arc Heat Input | | | | | | | Torch Travel Speed (cm/min) | Oscillation Condition | | | | Filler Metal Feed Rate (cm/min) | | Arc Time (min) |
|---|---|---|---|---|---|---|---|---|---|---|---|---|---|---|---|---|
| | | Current (Amp) | | | Voltage (Volt) | | Pulse Ratio (%) | | | Amplitude (mm) | Operating time (sec) | | | | | |
| | | Peak | Base | Mean | Peak | Base | Peak | Base | | | Left Wall | Middle | Right Wall | Peak | Base | |
| • Confining Gas Nozzle • Mixture of 50% Ar, 46.5% He, and 3.5% H₂ | 1 | 120 | 40 | 72 | 11.7 | — | 40 | 60 | 13.3 | — | — | — | — | — | 111 | 3.1 |
| | 2 | 140 | 60 | 106 | 12.9 | 11.8 | 57 | 43 | 9.9 | 3.5 | 0.4 | 0.3 | 0.4 | 203 | 203 | 4.3 |
| | 3 | 180 | 70 | 133 | 13.4 | 12.0 | 57 | 43 | 9.8 | 4.5 | 0.4 | 0.3 | 0.4 | 304 | 304 | 4.4 |
| | 4 | 220 | 130 | 175 | 13.4 | 12.0 | 50 | 50 | 7.9 | 6.6 | 0.4 | 0.4 | 0.4 | 355 | 355 | 5.4 |
| | 5 | 220 | 130 | 175 | 13.9 | 12.0 | 50 | 50 | 7.9 | 9.6 | 0.4 | 0.4 | 0.4 | 355 | 355 | 5.4 |
| | 6 | 220 | 130 | 175 | 13.9 | 12.0 | 50 | 50 | 6.6 | 11.4 | 0.5 | 0.5 | 0.5 | 355 | 355 | 6.3 |
| | 7-1 | 170 | 70 | 127 | 12.7 | 11.8 | 57 | 43 | 9.8 | 7.1 | 0.3 | 0.3 | 0.5 | 254 | 254 | 4.5 |
| | 7-2 | 190 | 90 | 142 | 12.7 | 11.8 | 57 | 43 | 6.5 | 8.4 | 0.6 | 0.5 | 0.5 | 254 | 254 | 6.5 |
| | | | | | | | | | | | | | | | Total | 39.9 min |

TABLE 5

| Type of Torch and Shielding Gas | Pass No. | Pulse Arc Heat Input | | | | | | | Torch Travel Speed (cm/min) |
|---|---|---|---|---|---|---|---|---|---|
| | | Current (Amp) | | | Voltage (Volt) | | Pulse Ratio (%) | | |
| | | Peak | Base | Mean | Peak | Base | Peak | Base | |
| • Confining Gas Nozzle • Pure Argon Gas | 1 | 120 | 40 | 72 | 10.3 | — | 40 | 60 | 13.3 |
| | 2 | 140 | 60 | 106 | 10.4 | 9.6 | 57 | 43 | 9.9 |
| | 3 | 180 | 70 | 133 | 10.4 | 9.6 | 57 | 43 | 9.8 |
| | 4 | 220 | 130 | 175 | 10.6 | 9.8 | 50 | 50 | 9.6 |
| | 5 | 220 | 130 | 175 | 10.6 | 9.8 | 50 | 50 | 9.6 |
| | 6 | 220 | 130 | 175 | 10.6 | 9.8 | 50 | 50 | 8.0 |
| | 7 | 220 | 140 | 180 | 10.6 | 9.8 | 50 | 50 | 8.0 |

| Type of Torch and Shielding Gas | Pass No. | Oscillation Condition | | | | Filler Metal Feed Rate (cm/min) | | | | Arc Time (min) |
|---|---|---|---|---|---|---|---|---|---|---|
| | | Amplitude (mm) | Operating time (sec) | | | Main Filler | | Auxiliary Filler | | |
| | | | Left-Wall | Middle | Right Wall | Peak | Base | Peak | Base | |
| • Confining Gas Nozzle • Pure Argon Gas | 1 | — | — | — | — | — | 111 | — | — | 3.1 |
| | 2 | 3.5 | 0.4 | 0.3 | 0.4 | 250 | 170 | 40 | 20 | 4.3 |
| | 3 | 4.5 | 0.4 | 0.3 | 0.4 | 380 | 270 | 50 | 25 | 4.4 |
| | 4 | 6.6 | 0.4 | 0.4 | 0.4 | 380 | 380 | 50 | 30 | 4.5 |
| | 5 | 9.6 | 0.4 | 0.4 | 0.4 | 380 | 380 | 50 | 30 | 4.5 |
| | 6 | 11.4 | 0.5 | 0.5 | 0.5 | 380 | 380 | 50 | 30 | 5.2 |
| | 7 | 13.0 | 0.5 | 0.5 | 0.5 | 390 | 390 | 60 | 40 | 5.3 |
| | | | | | | | | | Total | 31.3 min |

It has been confirmed that a mixture of argon and helium and a mixture of argon and hydrogen produce substantially equal effects as the shielding gas.

What is claimed is:

1. A pipe welding method that deposits a first weld bead in welding the circumference of butt-jointed pipes, at least one of the pipes comprising nickel or a nickel alloy, said pipe welding method comprising the steps of:

generating an arc between the pipes to be welded together and a tungsten electrode held by a welding torch, the pipes serving as a positive pole and the tungsten electrode serving as a negative pole;

emitting a shielding gas that comprises an argon-based mixed gas that contains at least one of hydrogen and helium from a confining gas nozzle concentric with the tungsten electrode and thereby confining the apparent flaring angle of the arc to a maximum of 80 degrees; and moving the welding torch along the weld line while feeding the tip of a filler wire to a part of the molten pool directly below the arc.

2. The pipe welding method of claim 1, wherein the pipes are double pipes, and wherein the pipes have an overlay comprising nickel or a nickel alloy.

3. The pipe welding method of claim 1, wherein at least one of the pipes is a double pipe having an inner pipe comprising nickel or a nickel alloy mechanically joined to an outer pipe, the double pipe having both ends thereof seal welded.

4. The pipe welding method of claim 1, wherein the argon-based mixed gas comprises 95–98% argon and 2–5% hydrogen.

5. The pipe welding method of claim 1, wherein the argon-based mixed gas comprises 40–50% argon and 50–60% helium.

6. The pipe welding method of claim 1, wherein the argon-based mixed gas comprises 45–55% argon, 40–50% helium and 2–5% hydrogen.

7. The pipe welding method of claim 1, wherein, in said step of emitting a shielding gas, the flow rate of the shielding gas emitted from the confining gas nozzle is maintained below a level above which a keyhole would be formed in the molten pool.

8. The pipe welding method of claim 1, wherein, in said step of emitting a shielding gas, the flow rate of the shielding gas emitted from the confining gas nozzle is 3–8 liters per minute.

9. A pipe welding method that deposits second and subsequent weld beads in welding the circumference of butt-jointed pipes, at least one of the pipes comprising nickel or a nickel alloy, said pipe welding method comprising the steps of:
    generating an arc between the pipes to be welded together and a tungsten electrode held by a welding torch, the pipes serving as a positive pole and the tungsten electrode serving as a negative pole;
    emitting a shielding gas from a confining gas nozzle concentric with the tungsten electrode; and
    oscillating a first filler wire integrally with the welding torch in a direction perpendicular to the weld line with a predetermined amplitude and frequency and moving the first filler wire along the weld line while feeding the tip thereof to a part of the molten pool directly below the arc, and oscillating a second filler wire at the same frequency as the first filler wire but 180° out of phase with the oscillation of the first filler wire, and moving the second filler wire along the weld line while feeding the tip thereof into the molten pool.

10. The pipe welding method of claim 9, wherein the pipes are double pipes, and wherein the pipes have an overlay comprising nickel or a nickel alloy.

11. The pipe welding method of claim 9, wherein at least one of the pipes is a double pipe having an inner pipe comprising nickel or a nickel alloy mechanically joined to an outer pipe, the double pipe having both ends thereof seal welded.

12. The pipe welding method of claim 9, wherein the shielding gas comprises an argon-based mixed gas that contains at least one of hydrogen and helium.

13. The pipe welding method of claim 12, wherein the argon-based mixed gas comprises 95–98% argon and 2–5% hydrogen.

14. The pipe welding method of claim 12, wherein the argon-based mixed gas comprises 40–50% argon and 50–60% helium.

15. The pipe welding method of claim 12, wherein the argon-based mixed gas comprises 45–55% argon, 40–50% helium and 2–5% hydrogen.

16. The pipe welding method of claim 9, wherein, in said step of emitting a shielding gas, the flow rate of the shielding gas emitted from the confining gas nozzle is maintained below a level above which a keyhole would be formed in the molten pool.

17. The pipe welding method of claim 9, wherein, in said step of emitting a shielding gas, the flow rate of the shielding gas emitted from the confining gas nozzle is 3–8 liters per minute.

18. The pipe welding method of claim 9, wherein, in said step of oscillating the first and second filler wires, the first and second filler wires are fed into the molten pool such that the first filler wire provides 80–90% of the deposited metal and the second filler wire provides 10–20% of the deposited metal.

19. A pipe welding method that welds the circumference of butt-jointed pipes, at least one of the pipes comprising nickel or a nickel alloy, said pipe welding method comprising the steps of:
    generating an arc between the pipes to be welded together and a tungsten electrode held by a welding torch, the pipes serving as a positive pole and the tungsten electrode serving as a negative pole;
    emitting a shielding gas that comprises an argon-based mixed gas that contains at least one of hydrogen and helium from a confining gas nozzle concentric with the tungsten electrode and thereby confining the apparent flaring angle of the arc to a maximum of 80 degrees; and
    applying a first welding pass by moving the welding torch along the weld line while feeding the tip of a first filler wire into a part of the molten pool directly below the arc; and
    applying second and subsequent welding passes by confining the arc through said step of emitting the shielding gas, oscillating the first filler wire integrally with the welding torch in a direction perpendicular to the weld line with a predetermined amplitude and frequency and moving the first filler wire along the weld line while feeding the tip thereof to a part of the molten pool directly below the arc, and oscillating a second filler wire at the same frequency as the first filler wire but 180° out of phase with the oscillation of the first filler wire, and moving the second filler wire along the weld line while feeding the tip thereof into the molten pool.

* * * * *